(12) United States Patent
Wilson

(10) Patent No.: US 8,347,101 B2
(45) Date of Patent: Jan. 1, 2013

(54) SYSTEM AND METHOD FOR ANONYMOUSLY INDEXING ELECTRONIC RECORD SYSTEMS

(75) Inventor: Stephen Wilson, Five Dock (AU)

(73) Assignee: Lockstep Consulting Pty Ltd., New South Wales (AU)

( * ) Notice: Subject to any disclaimer, the term of this patent is extended or adjusted under 35 U.S.C. 154(b) by 842 days.

(21) Appl. No.: 10/593,026

(22) PCT Filed: Mar. 15, 2005

(86) PCT No.: PCT/AU2005/000364
§ 371 (c)(1),
(2), (4) Date: May 14, 2007

(87) PCT Pub. No.: WO2005/088899
PCT Pub. Date: Sep. 22, 2005

(65) Prior Publication Data
US 2007/0245144 A1 Oct. 18, 2007

(30) Foreign Application Priority Data
Mar. 15, 2004 (AU) .............................. 2004201058

(51) Int. Cl.
*H04L 29/06* (2006.01)
(52) U.S. Cl. ........ 713/180; 713/182; 713/185; 713/186; 726/9
(58) Field of Classification Search ........................ None
See application file for complete search history.

(56) References Cited

U.S. PATENT DOCUMENTS

| | | | | |
|---|---|---|---|---|
| 5,606,610 A | * | 2/1997 | Johansson | 713/193 |
| 6,102,287 A | * | 8/2000 | Matyas, Jr. | 235/380 |
| 6,298,153 B1 | * | 10/2001 | Oishi | 382/186 |
| 6,299,062 B1 | * | 10/2001 | Hwang | 235/379 |

(Continued)

FOREIGN PATENT DOCUMENTS

JP 2006301831 A * 11/2006

(Continued)

OTHER PUBLICATIONS

Pirttikoski, Oskari. "Anonymous authentication services for third party entities", 2001, Publications in Telecommunications Software and Multimedia, entire article.*

(Continued)

*Primary Examiner* — Nathan Flynn
*Assistant Examiner* — Michael R Vaughan
(74) *Attorney, Agent, or Firm* — Christie, Parker & Hale, LLP.

(57) ABSTRACT

A method for issuing Anonymous Public Key Certificates to Registered Persons in an electronic record system, where pointers for indexing the record system are stored within the Anonymous Public Key Certificates, and where associated Private Keys are controlled by smartcards or similar devices. Electronic records may be identifiably indexed when the smartcard has been activated by its holder correctly entering their secret pass-phrase, or anonymously indexed when only the value of a pointer is known. The only direct linkage between each Anonymous Public Key Certificate and the associated Registered Person is through the associated Private Key as controlled by a smartcard or similar device. Using this invention the retrieval of identifiable records pertaining to a given Registered Person from an electronic record system is normally only possible with the agency of the Person's smartcard or similar device, and therefore normally only possible with the Person's consent.

13 Claims, 2 Drawing Sheets

U.S. PATENT DOCUMENTS

| | | | |
|---|---|---|---|
| 7,117,368 B2* | 10/2006 | Sako | 713/180 |
| 7,461,251 B2* | 12/2008 | Oishi | 713/162 |
| 7,840,813 B2* | 11/2010 | Canard et al. | 713/176 |
| 2001/0011351 A1* | 8/2001 | Sako | 713/180 |
| 2001/0054155 A1 | 12/2001 | Hagan et al. | |
| 2002/0004900 A1* | 1/2002 | Patel | 713/155 |
| 2002/0007320 A1* | 1/2002 | Hogan et al. | 705/26 |
| 2002/0107804 A1* | 8/2002 | Kravitz | 705/51 |
| 2002/0176583 A1 | 11/2002 | Buttiker | |
| 2002/0188848 A1 | 12/2002 | Buttiker | |
| 2002/0188854 A1* | 12/2002 | Heaven et al. | 713/186 |
| 2003/0097561 A1 | 5/2003 | Wheeler et al. | |
| 2003/0097573 A1 | 5/2003 | Wheeler et al. | |
| 2003/0101344 A1 | 5/2003 | Wheeler et al. | |
| 2006/0155985 A1* | 7/2006 | Canard et al. | 713/156 |

FOREIGN PATENT DOCUMENTS

| WO | WO 98/52161 | 11/1998 |
|---|---|---|
| WO | WO 01/41360 A2 | 6/2001 |

OTHER PUBLICATIONS

Oishi, Kazuomi. K. Oishi, "Unconditionally anonymous public-key certificates", The 2000 Symposium on Cryptography and Information Security, SCIS2000-C32, 2000.*

Supplemental European Search Report for corresponding application PCT/AU2005/000364, dated Oct. 6, 2009, 3pp.

International Search Report, dated May 13, 2005, corresponding to PCT/AU2005/000364.

Written Opinion, dated May 13, 2004, corresponding to PCT/AU2005/000364.

European Examination Report for corresponding European Patent Application No. 05 714 237.4, dated Apr. 14, 2011, 7pp.

* cited by examiner

SYSTEM AND METHOD FOR ANONYMOUSLY INDEXING ELECTRONIC RECORD SYSTEMS

CROSS-REFERENCE TO RELATED APPLICATION

This application is a National Phase Patent Application of International Application Number PCT/AU2005/000364, filed on Mar. 15, 2005, which claims priority of Australian Patent Application Number 2004201058, filed on Mar. 15, 2004.

TECHNICAL FIELD

The present invention relates to electronic record systems and in particular relates to the unambiguous identification of registered persons in the systems to whom the records pertain, while retaining anonymity of the registered persons so that their private records are not readily identifiable by unauthorised persons as belonging to the registered persons.

BACKGROUND ART

An example of an electronic record system can be found in electronic health record systems. Electronic health record systems use computer memory stores to retain information relating generally to the healthcare and medical episodes of patients. Users of electronic health record systems include patients, primary care doctors, clinical specialists, hospital doctors, acute care nurses, community nurses, medical researchers, healthcare managers, healthcare policy analysts, and agents of health insurance companies. Electronic health record systems bring a range of benefits to patients, to authorised users and to healthcare systems generally. These benefits include easier and/or faster access to important healthcare information at the point of clinical care where treatment is being delivered to patients, improved clinical outcomes resulting from better quality information being available at the point of clinical care, less frequent re-admissions to hospital as a result of better information being available to primary healthcare providers, reduced costs associated with the gathering of redundant clinical information, reduced costs associated with re-keying of clinical information from paper records, and enhanced quality of healthcare across the entire healthcare system resulting from continuous improvement to treatment modalities made possible by accumulated performance data.

Electronic health record systems generally require patients to be unambiguously identified so that authorised users with a legitimate interest in a given patient may reliably access information pertaining to that patient and to that patient alone.

It will be appreciated by persons skilled in the field of electronic health record systems that the systems can generally be constructed in a range of ways in respect of the degree of centralization of the component data items that together constitute the whole of a given person's electronic health record. It is possible to construct an electronic health record system where all component data items relating to each patient (or a significant majority of the component data items relating to each patient) are stored within a substantially single centralized computer memory store. Alternatively, it is possible to construct an electronic health record system where component data items relating to each patient are stored separately within a plurality of different decentralised computer memory stores. Users of decentralised electronic health record systems may be provided with search engine computer software which may automatically locate data items pertaining to a given patient wherever the records are located across the plurality of computer memory stores, and additional computer software which may subsequently collate, process and/or present to the user information from the component data items.

Whether an electronic health record system is constructed to use centralized memory storage or to use decentralised memory storage, it remains an important requirement that each patient be unambiguously identified.

Electronic health record systems generally include an access control function which serves to restrict the type of information, amount of information and/or degree of detail of information made available to different types of users. As is generally understood by those skilled in the field of electronic health records, different types of users have different needs in respect of the information they are entitled to exchange with an electronic health record system. Certain users may be authorised to write new information into the electronic health record of a given patient or to modify existing information relating to a patient, while other users may only be authorised to read information without modifying the information. Further, information retrieved from an electronic health record system may be 'de-identified' before being made available to a user, depending on the type of user who requested the information. The term 'de-identified' refers to patient data from which has been removed accompanying identifying information, such identifying information enabling the patient to be associated with that data unless removed.

In general, authorised healthcare providers with a direct clinical interest in a patient may be entitled to access identifiable patient information pertaining to that patient from an electronic health record. The authorised healthcare providers may include primary care doctors, hospital doctors, specialist doctors, acute care nurses, community care nurses, medical diagnosticians, and allied health workers. Non-clinical health system workers with no direct clinical interest in patients may nevertheless have legitimate interests in de-identified electronic health records for purposes such as population health research, epidemiological investigation, compilation of evidence as to the efficacy of given healthcare protocols, and analysis of cost-benefit data across health systems. The non-clinical health system workers could include academic researchers, public policy analysts, authorised civil servants from public health systems, human resources professionals, and authorised administrators of healthcare institutions. The access control function of an electronic health record may be designed to include a categorization scheme for authorised users to be applied when processing requests from users to access information within the electronic health record system.

Health authorities generally issue members of the public with unique health system identification numbers. Such identification numbers are conventionally printed on the surface of a health system identification card (referred to herein as a Health ID Card) together with the name of the person to whom the identification number has been issued (referred to herein as a Card Holder). Different health systems make use of different types of card technologies to convey health system identification numbers, including paper, cardboard or plastic cards. Plastic Health ID Cards may additionally feature magnetic stripe memory storage and/or integrated circuit memory storage. The additional memory storage may be used to store the name of the Card Holder, the health system identification number of the Card Holder and/or other Card Holder information. Information stored in magnetic stripe memory or integrated circuit memory is more readily entered into healthcare computer systems with which the Health ID Card may be used, at the time and place in which healthcare services are provided.

Health ID Cards may be issued and distributed by government authorities and used widely across national health systems. National Health ID Card systems are known in relation to the management of public health insurance entitlements and payments. Independent Health ID Card systems may additionally be created by commercial organizations such as private health insurers, by regional or local government healthcare authorities, and/or by healthcare institutions such as hospitals.

In order to maximise patient privacy in the design of electronic health record systems, it is desirable to minimise the amount of identifiable personal information which is contained in each component data item of the electronic health record. Yet the need to index patient information generally requires that some type of record pointer information uniquely linked to the identity of the patient be stored within each component data item pertaining to that patient. It has been recognised by the present inventor that this design requirement leads to a potential problem, where if an unauthorised person obtains access to an electronic health record and additionally has knowledge of the linkage between patients' identities and their respective record pointer values, then the unauthorised person can readily match component data items from the electronic health record with the identities of patients, thus inappropriately identifying healthcare information which is intended to remain private and confidential.

The relatively high level of familiarity and widespread availability of many existing Health ID Card systems may appear to make them attractive options for indexing electronic health records. However, it has now been recognised that the re-use of existing health system identification numbers as pointers to index electronic health records can cause problems in respect of privacy. Health system identification numbers as printed on Health ID Cards become known to indeterminate numbers of people through the normal use and visual sightings of the cards over time in the healthcare system. Unscrupulous persons may make illicit copies of patients' names together with matching health system identification numbers. Under these circumstances any electronic health record system which utilises health system identification numbers as pointers to index patient information will be vulnerable to unauthorised access by persons with knowledge of patient information from Health ID Cards. Thus, existing health system identification numbers and Health ID Cards should not be used without significant modification as a method to more securely index patient information in an electronic health record.

While such problems have been described with reference to electronic health records, similar problems exist in many other electronic record systems, such as passport identification data systems. The term "electronic passport" refers to recent developments where conventional passports are made more resistant to forgery, and more useful for border surveillance, by the inclusion of a microchip and a communications interface, typically wireless. The microchip contains information about the passport holder, such as a biometric template. When the passport holder passes through an immigration checkpoint, information is retrieved from the microchip by a customs officer using a workstation, and compared with other information at hand, such as a fresh biometric scan taken from the holder, in order to, amongst other things, confirm they are indeed the person to whom the passport was issued.

Significant security and privacy vulnerabilities arise in some electronic passport designs by virtue of the method used to retrieve information from the passport, and the way that information is formatted. For instance, it may be possible in some designs for information to be retrieved by unauthorised wireless receivers. Information stored within electronic passports is not necessarily encrypted, and may include personal, identifying information, such as name and date of birth.

A further feature of certain electronic record systems is the use of Public Key Infrastructure as a method to authenticate users of the electronic record systems. Public Key Infrastructure refers broadly to the issuance of so-called Public Key Certificates to registered users in a defined transaction system, the usage in software programs of the Public Key Certificates as inputs to verify so-called Digital Signatures which secure electronic transmissions and electronic data records, and the deployment of computer systems and management processes to facilitate the lifecycle maintenance of the Public Key Certificates.

A Public Key Certificate is an electronic document containing in a standardised format at least the following:

information pertaining to the person or entity to whom the Public Key Certificate is issued (known as the "Certificate Holder", "Certificate Subject" or "Certificate Subscriber")

a copy of an asymmetric cryptographic Public Key assigned to the Certificate Holder information pertaining to the identity of the entity which issued the Public Key Certificate (the issuing entity being known as a "Certification Authority")

date and time information defining a Validity Period for the Public Key Certificate the Digital Signature of the Certification Authority.

A Certification Authority may be assisted by one or more Registration Authorities in respect of the process of issuing Public Key Certificates to Certificate Holders. The Registration Authorities are affiliated with the Certification Authority and verify the identity and eligibility of persons applying to be issued with Public Key Certificates according to identification protocols and other conditions laid down by the Certification Authority. Further, a Certification Authority may publish copies of Public Key Certificates together with other pertinent information in a generally available online repository so that parties to electronic transactions involving Certificate Holders may verify information provided by the Certificate Holders against the information published in the repository.

The phrase Digital Signature refers generally to a computer generated code related to a given digital data item and created through the operation of a cryptographic algorithm on the data item in conjunction with a unique asymmetric cryptographic Private Key to which is linked a unique asymmetric cryptographic Public Key. Verification that a given Digital Signature was in fact created from a given data item may be performed through a further operation of a related cryptographic algorithm on the Digital Signature in conjunction with the asymmetric cryptographic Public Key. Provided the asymmetric cryptographic Private Key is reliably under the control of a Public Key Certificate Holder, a third party is able to reliably ascribe a digitally signed data item to the Public Key Certificate Holder, by being informed of the associated Public Key and verifying a Digital Signature code and the digitally signed data item in conjunction with the Public Key.

An important purpose of Public Key Certificates is therefore to provide to persons using Public Key Infrastructure reliable and widely available evidence of the association between a given Public Key Certificate Holder and their respective asymmetric cryptographic Public Key, and by extension the association between that Certificate Holder and their respective asymmetric cryptographic Private Key.

In certain embodiments of Public Key Infrastructure the usability and security of asymmetric cryptographic Private Keys is enhanced by the storage of the Private Keys under the control of a portable personal computing device, one example of which is that commonly known as a smartcard.

Where Public Key Infrastructure is used within an electronic record system, certain events occurring in the system may be securely recorded with the aid of Digital Signatures of persons associated with the events. In particular where a given authorised user has originated a new data item to be written into the electronic record then the data item may be Digitally Signed by the authorised user. In the particular case of an electronic health record system where a given healthcare provider has originated a new data item pertaining to a given patient to be written into the electronic record, then the data item may be digitally signed by both the healthcare provider and the patient.

However, it has now been recognised that such Public Key Infrastructure poses certain problems in respect of the privacy of persons whose personal information is contained in an electronic record system. In particular where Public Key Certificates are made generally available by Certificate Authorities via repositories it may be possible for unauthorised persons to readily identify Public Key Certificate Holders.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect, the present invention provides a method for anonymously indexing an electronic record system, the method comprising:

storing an asymmetric cryptographic private key under the control of a portable storage device of a registered user;

storing an anonymous public key certificate, the anonymous public key certificate being associated with an asymmetric cryptographic public key matching the asymmetric cryptographic private key;

providing the portable storage device with information for associating the registered user with the portable storage device; and indexing within an electronic record system personal information of the registered user, whereby association of the information with the registered user is anonymously verifiable by use of the anonymous public key certificate.

According to a second aspect the present invention provides an anonymously indexed electronic record system comprising:

a portable storage device for a registered user, an asymmetric cryptographic private key being under the control of the portable storage device, the portable storage device being provided with information for associating the registered user with the portable storage device;

a stored anonymous public key certificate associated with an asymmetric cryptographic public key matching the asymmetric cryptographic private key, an electronic storage indexing personal information of the registered user, whereby association of the information with the registered user is anonymously verifiable by use of the anonymous public key certificate.

According to a third aspect the present invention provides a portable storage device for a registered user of an anonymously indexed electronic record system, the portable storage device being provided with information for associating the registered user with the portable storage device, wherein an asymmetric cryptographic private key is under the control of the portable storage device, wherein an anonymous public key certificate is associated with an asymmetric cryptographic public key matching the asymmetric cryptographic private key, and wherein association of anonymously indexed personal information with the user is anonymously verifiable by use of the anonymous public key certificate.

According to a fourth aspect the present invention provides an electronic storage for an anonymously indexed electronic record system, the electronic storage indexing personal information of a registered user, wherein association of the personal information with the registered user is anonymously verifiable by use of an anonymous public key certificate associated with an asymmetric cryptographic public key matching an asymmetric cryptographic private key under the control of a portable storage device of the registered user.

According to a fifth aspect the present invention provides a method of issuing Public Key Certificates to Registered Persons within an electronic record system, the method comprising the steps of:

Issuing on behalf of each Registered Person whose personal information is held within an electronic record system a portable personal computing device with the ability to control the storage of one or more asymmetric cryptographic Private Keys.

Visibly printing upon the surface of the personal computing device human readable identity information pertaining to the Registered Person.

Generation of at least one pair of matching asymmetric cryptographic Private and Public Keys.

Storage of at least one of the asymmetric cryptographic Private Keys under the control of the portable personal computing device.

Creation on behalf of each Registered Person a Public Key Certificate for each asymmetric cryptographic Public Key which matches each asymmetric cryptographic Private Key stored under the control of the portable personal computing device.

Inclusion in one or more of the Public Key Certificates one or more electronic record pointers with which personal information pertaining to the Registered Person may be indexed within the electronic record system.

Issuance of the Public Key Certificate(s) to the Registered Persons.

According to a sixth aspect the present invention provides a means for issuing Public Key Certificates to Registered Persons within an electronic record system, the means comprising the elements of:

One or more portable personal computing devices with the ability to control the storage of one or more asymmetric cryptographic Private Keys.

A recognised authoritative entity to issue the portable personal computing devices to Registered Persons about whom personal information is held within the electronic record system.

Human readable identity information pertaining to the Registered Persons visibly printed on the surface of respective the portable personal computing devices.

A key generation system to create at least one pair of asymmetric cryptographic Private and Public Keys for each Registered User.

A Public Key Certificate issued to each Registered Person corresponding to each asymmetric cryptographic Private Key stored under the control of the portable personal computing devices.

At least one electronic record pointer contained within the data contents of each Public Key Certificate where the electronic record pointer may be used to index records within the electronic record system pertaining to the Registered Person to whom each Public Key Certificate has been issued.

A Certification Authority which creates the Public Key Certificates for the Registered Persons.

According to a seventh aspect, the present invention provides a method of issuing Anonymous Public Key Certificates to Registered Persons whose personal information is held within an electronic record system, the method securely linking the Anonymous Public Key Certificates to portable personal computing devices issued respectively to the same the Registered Persons, the linking being effected by storing the asymmetric cryptographic Private Key associated with each Anonymous Public Key Certificate under the control of the portable personal computing devices, and storing electronic record pointers within the Anonymous Public Key Certificates, so that the Registered Persons' records may variously be indexed identifiably using their name and/or other identity information, or alternatively indexed anonymously using the electronic record pointers; the method comprising the steps of:

Issuing to each Registered Person whose personal information is held within an electronic record system a portable personal computing device with the ability to control the storage of one or more asymmetric cryptographic Private Keys.

Visibly printing upon the surface of the personal computing device human readable identity information pertaining to the Registered Person, where the information without limitation may include the name of the Registered Person and/or other information as may be relevant to the management of records pertaining to the Registered Person.

Generation of one or more pairs of matching asymmetric cryptographic Private and Public Keys.

Storage of the asymmetric cryptographic Private Key(s) under the control of the portable personal computing device.

Issuing to each Registered Person an Anonymous Public Key Certificate for each asymmetric cryptographic Public Key which matches each asymmetric cryptographic Private Key stored under the control of the portable personal computing device.

Inclusion within the data contents of each Anonymous Public Key Certificate one or more electronic record pointers which may be used to index records pertaining to the Registered Person stored within the electronic record system.

According to an eighth aspect, the present invention provides a means for issuing Anonymous Public Key Certificates to Registered Persons about whom personal information is held within an electronic record system, the means including electronic record pointers contained in the Anonymous Public Key Certificates, and linking the Anonymous Public Key Certificates to smartcards or similar portable personal computing devices capable of controlling the storage of asymmetric cryptographic Private Keys; the means comprising the elements of:

One or more portable personal computing devices with the ability to each control the storage of one or more asymmetric cryptographic Private Keys.

A recognised authoritative entity to issue the portable personal computing devices to Registered Persons whose personal information is held within the electronic record system.

Human readable identity information pertaining to each Registered Person visibly printed on the surface of respective the portable personal computing devices where the identity information without limitation may include the name of the Registered Person and/or other information as may be relevant to the management of records pertaining to the Registered Person.

A key generation system to create asymmetric cryptographic Private and Public Keys.

One or more Public Key Certificates issued to each Registered Person and associated with respective asymmetric cryptographic Private Keys stored under the control of the portable personal computing devices.

One or more electronic record pointers contained within the data contents of each Public Key Certificate where the electronic record pointers may be used to index records within the electronic record system pertaining to the Registered Person to whom each Public Key Certificate has been issued.

A Certification Authority which creates the Public Key Certificates for the Registered Persons.

One or more Registration Authorities which may assist the Certification Authority in producing Public Key Certificates, in particular by verifying the identity and eligibility of Registered Persons applying for Public Key Certificates.

The present invention recognises that it is possible for an Anonymous Public Key Certificate to be created and issued which does not contain the name of the person to whom the certificate is issued. In order for the Anonymous Public Key Certificate to be useful it is desirable that authorised users are able to link a given Anonymous Public Key Certificate holder to their Public Key Certificate. Thus the present invention disclosed herein provides a method for securely effecting a link between a given Anonymous Public Key Certificate Holder and their Public Key Certificate where the link under normal circumstances is under the sole control of the Certificate Holder. Further embodiments of the present invention provide a method for including within the Anonymous Public Key Certificate one or more computer memory pointers with which records pertaining to the Public Key Certificate Holder may be indexed from within an electronic record system. Accordingly, the present invention provides for the association of such indexed records with a particular registered person to be verified, without the identity of that person being required, thus providing for that association to be anonymously verified.

A significant advantage of this invention is that the only direct linkage between each Anonymous Public Key Certificate and the Registered Person to whom the Anonymous Public Key Certificate has been issued is through the asymmetric cryptographic Private Key associated with the Public Key Certificate. In keeping with generally understood principles of Public Key Infrastructure, the only operative instance of each Private Key is stored under the control of a portable personal computing device issued to the Public Key Certificate Holder. Therefore the only direct means to link a Registered Person to their corresponding Anonymous Public Key Certificate is through the Registered Person's portable storage device or portable personal computing device which is understood to remain at all times under the control of the Registered Person. Using this invention, the retrieval of identifiable records pertaining to a given Registered Person from the electronic record system is normally only possible with the agency of the Registered Person's portable personal computing device and therefore with the Registered Person's consent.

Embodiments of the present invention may thus be well suited to applications where Public Key Infrastructure is used as an authentication method for electronic records management. The invention is particularly well suited to applications where smartcards or similar portable personal computing devices are used to control asymmetric cryptographic Private Keys within the Public Key Infrastructure. For example, the invention may find particular application in electronic health records or electronic passport information management.

Where an Anonymous Public Key Certificate containing an electronic record pointer is associated with an asymmetric cryptographic Private Key, it will be appreciated that any Digital Signature code created for a given data item by the Registered Person to whom the Anonymous Public Key Certificate has been issued has the effect of linking the data item to the value of the electronic record pointer associated with the Registered Person. Verification of the Digital Signature code using the Anonymous Public Key Certificate evinces the association of the electronic record pointer with both the data item and the Registered Person. Yet examination of the data item and the Anonymous Public Key Certificate will not reveal the identity of associated the Registered Person.

It will be seen that alternative means for accessing a given Registered Person's Anonymous Public Key Certificate is required in a practical electronic record system in order for legitimate non-consensual access to personal electronic records to be possible under emergency conditions and under other prescribed conditions as may apply for a particular electronic record system. Such means are described elsewhere in this specification.

In a preferred embodiment of this invention, the portable personal computing devices take the form of smartcards issued to the Registered Persons where upon the surface of each smartcard is printed the name of corresponding the Registered Person together with such additional identity information as is deemed necessary by the designer of the electronic record system.

In a particularly preferred embodiment of this invention, a national healthcare authority deploys smartcards as patient identity cards where the smartcards have the capability to control the storage of one or more asymmetric cryptographic Private Keys. The smartcards are not necessarily initially issued with the Private Key(s). At some later time each patient to whom a smartcard has been so issued may individually elect to have one or more asymmetric cryptographic Private Keys stored under the control of the smartcard and with corresponding Anonymous Public Key Certificates created on the patient's behalf. It will be understood by persons skilled in the field of electronic health record systems that an electronic record pointer value stored within the Anonymous Public Key Certificate may be what is commonly known as a Unique Patient Identifier.

Subsequently in this particularly preferred embodiment, healthcare providers with a direct clinical interest in the patient may with the patient's cooperation and consent, use the patient's smartcard to identifiably exchange information pertaining to the patient with an electronic health record system. Alternatively, other health system workers with no direct clinical interest in a patient may use a given anonymous electronic record pointer value to index anonymous or de-identified information for the patient from the electronic health record system. Further the electronic record pointer value may be stored within the data contents of the Anonymous Public Key Certificate which has been issued to the patient.

As is generally understood, electronic health record system actions such as writing new data to a given patient's record generally requires the consent of the patient together with the agency of an authorised healthcare worker. In typical electronic health record systems, the healthcare worker must usually be authorised by the patient. In a preferred embodiment of the present invention, patient consent is unambiguously mediated by the patient undertaking certain prescribed actions with their portable personal computing device as appropriate to the design of the electronic health record system in use. As is generally understood by persons skilled in electronic security systems, portable personal computing devices may be pass-phrase protected such that the holder of such a portable personal computing device must first enter a secret pass-phrase known only to the holder into a computer workstation in order to activate the personal device. In a preferred embodiment therefore the fact of a given patient's consent for a healthcare provider to perform a certain action upon the patient's electronic health record is conveyed to the electronic health record system by the action of the patient deliberately using their portable personal computing device in conjunction with the healthcare provider's workstation and correctly entering their secret pass-phrase.

In a preferred embodiment the present invention allows for an explicit record to be made of patient consent as to each consensual action undertaken by a healthcare provider on the patient's electronic health record where each record of consent is comprised of a Digital Signature code created using the patient's asymmetric cryptographic Private Key operating on a data item in the electronic health record which is representative of the consensual action.

An objective of the present invention is to provide for a linkage between a given Registered Person's identity and one or more Anonymous Public Key Certificates issued to the Registered Person where the linkage is only ordinarily available via the agency of the Registered Person's portable personal computing device. The present invention provides that identifiable access to information pertaining to a Registered Person from an electronic record system ordinarily requires the Registered Person to present their portable personal computing device to a workstation (such as by inserting the personal device into a reader or by having the personal device within range of a wireless scanner) and enter their secret pass-phrase into a computer workstation in order to activate the portable personal computing device. As has been mentioned previously in this specification, it may be necessary in a practical electronic record system for legitimate non-consensual access to personal electronic records to be made possible under emergency conditions or under other prescribed conditions as may apply for a particular electronic record system. In a preferred embodiment where the electronic health system is an electronic health record system and Registered Persons are patients whose personal health information is stored within the electronic health record system it may be important for emergency healthcare providers such as hospital doctors to be able to retrieve identifiable information from an electronic health record system pertaining to a given patient when the patient is not competent to enter their secret pass-phrase into a workstation to activate their portable personal computing device. Those skilled in the field of electronic health record systems will appreciate that one example of such a scenario where a given patient may not be competent to enter their secret pass-phrase is where the patient has lost consciousness.

It is to be appreciated that the present invention is equally applicable to singular Health ID Card systems such as National Health systems, and to plural Health ID Card systems, for example including Independent or Private Health systems.

It will be appreciated by persons skilled in the design of electronic record systems and/or electronic security devices that in practical embodiments of the present invention there is a range of potential methods for archiving copies of electronic record pointers in such a way that the pointers may be linked to the identity of respective Registered Persons associated with the pointers. It is outside the scope of the invention as broadly described in this specification to describe the archiving methods in detail. In order only to demonstrate that the practical requirement for provision within the present invention of legitimate non-consensual access to a Registered Person's personal electronic records may be met, it is noted here that the archiving methods may without limitation include: transmission to a trusted third party copies of electronic record pointers and names of respective Registered Persons to whom the pointers relate and subsequent provision on request by duly authorised persons copies of the pointers corresponding to the names of given Registered Persons; or construction of portable personal computing devices with a facility to grant access to the Public Key Certificate memory store controlled by the portable personal computing devices by duly authorised persons entering an emergency access secret pass-phrase without the Registered Persons entering their own secret pass-phrase.

Preferred embodiments of the invention avoid ready identification of a patient from knowledge of the patient's electronic health record pointer values, by making the linkage of the pointer value and the respective patient identity unavailable to all persons except for the patient.

BRIEF DESCRIPTION OF THE DRAWINGS

By way of example only, preferred embodiments of the invention will be described with reference to the accompanying drawings, in which.

DETAILED DESCRIPTION OF THE INVENTION

The best mode of performing the invention will now be described in relation to an electronic health record system where Registered Persons are Patients carrying smartcard based Health ID Cards. However it will be recognised that the invention is equally applicable to other electronic record systems in contexts other than the provision of healthcare services. It will be further recognised that the invention is equally applicable to portable personal computing devices of various kinds issued by other kinds of entities.

Figure 1:
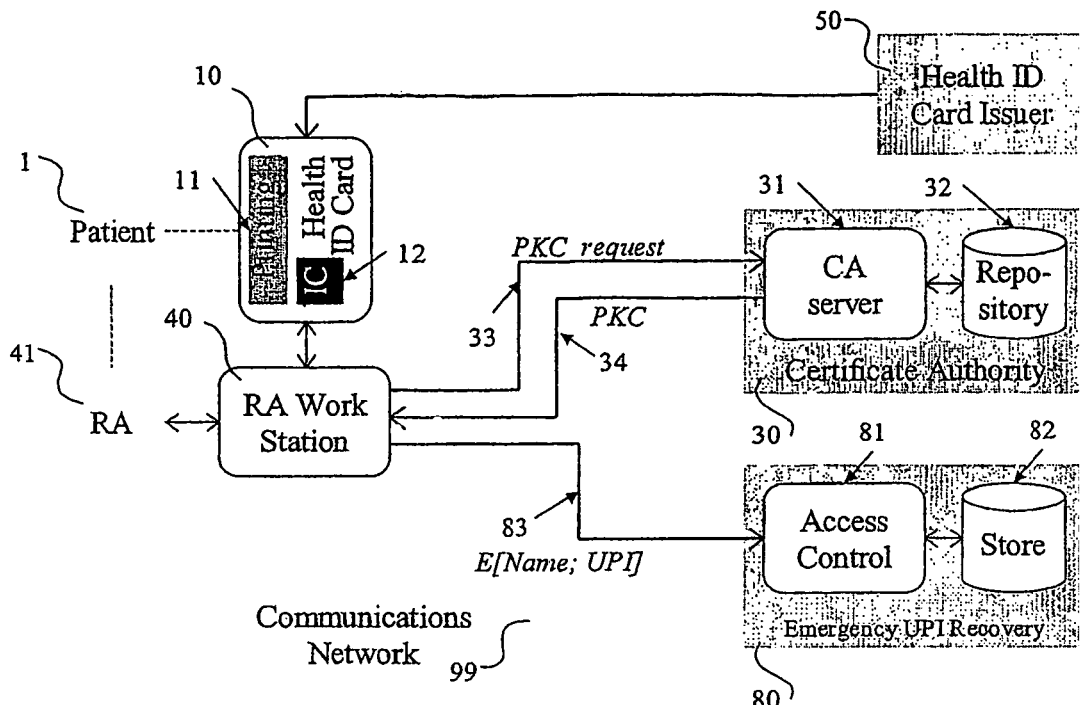
FIG. 1 is a block diagram representing the distribution of Health ID Cards to Patients and the issuance of associated Anonymous Public Key Certificates to the Patients.

With reference to FIG. 1, a system of issuing suitable portable personal computing devices and associated Public Key Certificates is detailed. In the preferred embodiment each portable personal computing device is a chip-enabled Health ID Card 10 issued by an authoritative entity 50 to a Patient 1. Each Health ID Card 10 has human readable printed information 11 on its surface pertaining to the identity of the Patient 1, and an Integrated Circuit 12 capable of storing one or more asymmetric cryptographic Private Keys. In the preferred embodiment the Health ID Card issuer 50 distributes each Health ID Card 10 in an initial state where no Private Key has yet been issued to the Patient 1.

At some time after receiving their Health ID Card 10, Patient 1 attends a Registration Authority 41. The Registration Authority 41 is associated with a Certification Authority 30. The Registration Authority 41 is responsible for verifying the personal identity and entitlements of the Patient 1 and, if the identity and entitlements are satisfactorily verified, requesting of Certification Authority 30 that a Public Key Certificate be issued to Patient 1. The Certification Authority 30 has operational elements including a Certification Authority Server 31 which creates Public Key Certificates and a Repository 32 which stores copies of Public Key Certificates and other related information made generally available to users of the system.

The Registration Authority 41 performs its functions with the aid of a Registration Authority Workstation 41, being a computer system with communications interfaces to both the Health ID Card Integrated Circuit 12 and the Certification Authority 31. In keeping with commonly understood principles of Public Key Infrastructure, after Key Pair generation, the asymmetric cryptographic Private Key is stored within the Health ID Card Integrated Circuit 12 while a copy of the asymmetric cryptographic Public Key is transmitted in the form of a Public Key Certificate Request 33 by the Registration Authority Workstation 40 over a Communications Network 99 to the Certification Authority Server 31. The Certification Authority Server 31 processes the Public Key Certificate Request 33, creates an Anonymous Public Key Certificate containing no identity information pertaining to Patient 1, publishes a copy of the Anonymous Public Key Certificate on the Repository 32, and transmits a copy of the Anonymous Public Key Certificate back to the Registration Authority Workstation 40. While the Anonymous Public Key Certificate contains no identity information pertaining to Patient 1, it does contain the value of a numerical Unique Patient Identifier corresponding to Patient 1. The numerical Unique Patient Identifier serves as an electronic record pointer to index information on Patient 1 from within an electronic health record system.

In its preferred embodiment the invention provides for an alternative method for authorised healthcare providers to obtain access under prescribed conditions to a copy of a Unique Patient Identifier as stored within the Anonymous Public Key Certificate of a given Non-Competent Patient without it being necessary for the Health ID Card of the Non-Competent Patient to be pass-phrase activated. Referring to FIG. 1, the alternative method in this preferred embodiment comprises the steps of:

- At the time the Anonymous Public Key Certificate containing a Unique Patient Identifier is created and issued to Patient 1, a copy of the Unique Patient Identifier is made.
- A Digital Data Item is made comprising the Unique Patient Identifier and a copy of the name of Patient 1 and/or other identity information sufficient to uniquely identify Patient 1 within the electronic health record system.
- The Digital Data Item is encrypted using an asymmetric cryptographic Public Key belonging to a trusted Emergency Unique Patient Identifier Recovery entity 80.
- The Encrypted Digital Data Item 83 is transmitted to the Emergency Unique Patient Identifier Recovery entity 80.
- On receipt of Encrypted Digital Data Item 83 the Emergency Unique Patient Identifier Recovery entity 80 uses an Access Control function 81 to verify the source of the data and stores the encrypted data in secure memory Store 82, for later use.

Figure 2:
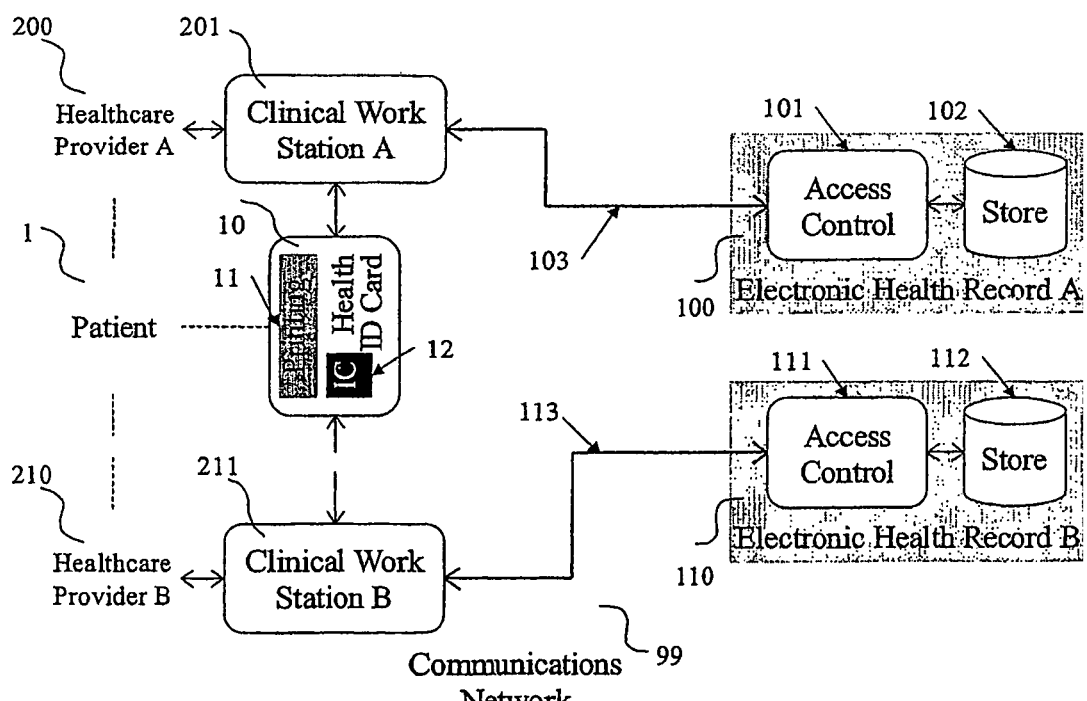
FIG. 2 is a block diagram which, for the purposes of illustration, represents a plurality of Healthcare Providers with an interest in the one Patient, and a preferred method by which the Healthcare Providers may with the Patient's consent exchange identifiable personal information about the Patient with a plurality of electronic health record systems.

With reference to FIG. 2, systems for utilising the Health ID Card 10 and associated Anonymous Public Key Certificate to update electronic health records are detailed. When attending a Healthcare Provider 200 the Patient 1 presents their Health ID Card 10 to a Clinical Work Station 201 and activates the asymmetric cryptographic Private Key(s) controlled by the Health ID Card 10 by correctly entering a secret pass-phrase. It will be appreciated by persons skilled in electronic security systems that once a Private Key controlled by the Health ID Card 10 has been so activated, the Access Control function 101 can verify through a variety of means that the Patient 1 attending the Clinical Workstation 201 is the same Patient to whom any given digitally signed data item applies. In this preferred embodiment, such verification is performed by Access Control 101 extracting from the Public Key Certificate associated with the given digitally signed data item the associated asymmetric cryptographic Public Key, creating an asymmetric cryptographic challenge using the Public Key, and transmitting the challenge to the Clinical Workstation 201. The Clinical Workstation 201 then responds to the challenge using the asymmetric cryptographic Private Key of Patient 1 as controlled by Health ID Card 10 and transmits its response to the Access Control 101. If the response received by Access Control 101 correctly matches the challenge then Access Control 101 can proceed to grant access to the Clinical Workstation 201 on the basis that the Health ID Card 10 has been shown to control the same asymmetric cryptographic Private Key as was used to create Digital Signature codes on the data items.

Subsequently, under the control of software in Clinical Workstation 201, new data items created by Healthcare Provider A 201 pertaining to Patient 1 are digitally signed using the asymmetric cryptographic Private Key of Patient 1 before being transmitted 103 to associated Electronic Health Record A 100. At a different time when Patient 1 attends a different Healthcare Provider B 210, similar processes of digitally signing data items under the control of Clinical Workstation B 211 are undertaken in relation to what in the case of FIG. 2 is a separate Electronic Health Record B 110.

Although it is beyond the scope of the current invention, it is noted that the rights of any given healthcare provider with a direct clinical interest in a given patient to access certain records pertaining to the patient will typically be governed by access control rules designed for the electronic record system in question. The access control rules are expressed in software in Access Control 101 and Access Control 111 for respective Electronic Health Record systems shown in FIG. 2.

Figure 3:
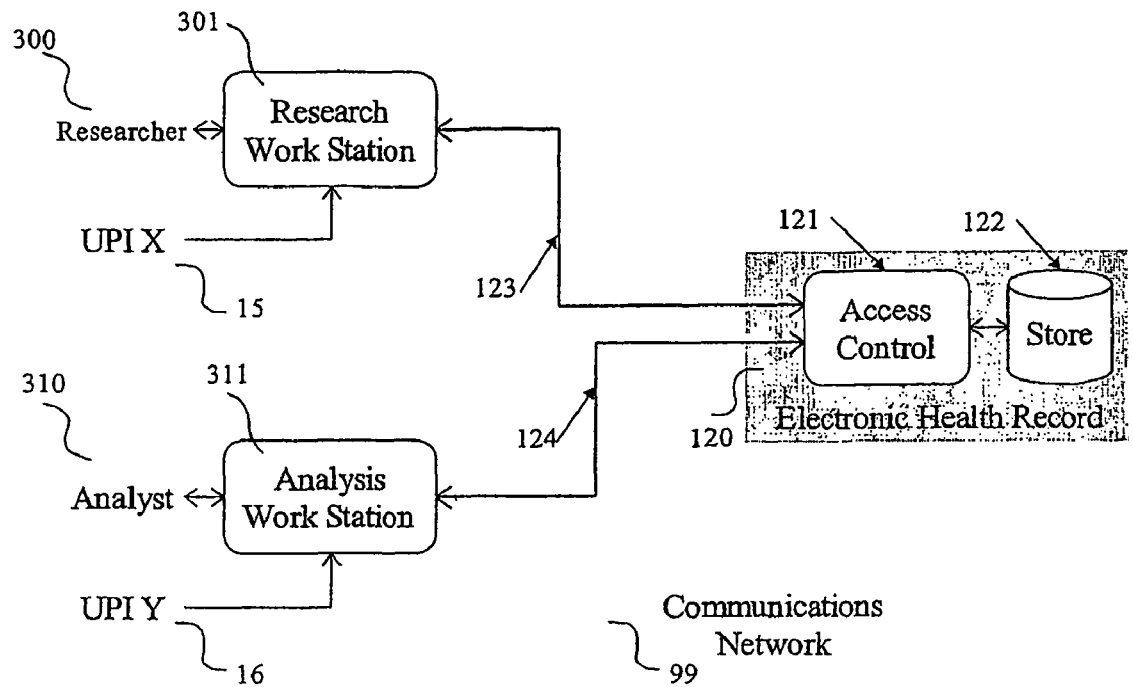
FIG. 3 is a block diagram which, for the purposes of illustration, represents a plurality of non-clinical health system workers with no direct interest in any Patients, and a preferred method by which the non-clinical health system workers may access de-identified information about a given Anonymous Patient using the Patient's electronic health record pointer.

With reference to FIG. 3, systems for anonymously accessing electronic health records pertaining to a given patient are detailed. Shown are a Public Health Researcher 300 and a Health Policy Analyst 310 who have interests in information stored in Electronic Health Record 120 pertaining to patients identified anonymously by Unique Patient Identifier X 15 and Unique Patient Identifier Y 16. The rights of Researcher 300 and Analyst 310 to access certain records pertaining to patients in whom Researcher 300 and Analyst 310 have no direct clinical interest are governed by access control rules expressed in software in Access Control 131. The present invention prevents Researcher 300 or Analyst 310 determining the identity of any patients from knowledge of the patients' Unique Patient Identifiers and/or access to data items from Electronic Health Record 120 digitally signed by the patients using their respective Health ID Cards.

Figure 4:
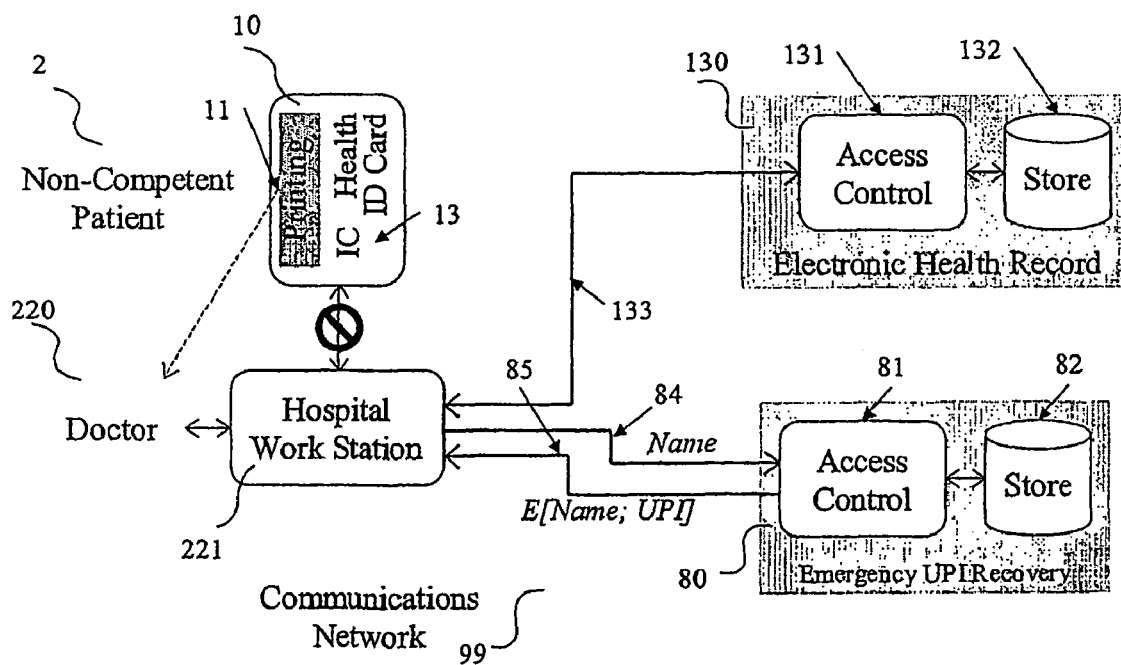
FIG. 4 is a block diagram which, for the purposes of illustration, represents a Hospital Doctor attempting to provide emergency clinical treatment to a Non-Competent Patient, and a preferred method by which the Hospital Doctor may firstly retrieve the Non-Competent Patient's Anonymous Public Key Certificate using the Non-Competent Patient's name and/or other health system identity information, and secondly use a Health Record Pointer from the Anonymous Public Key Certificate to index the Non-Competent Patient's electronic health record.

With reference to FIG. 4, one system for authorised healthcare providers to gain access under prescribed emergency conditions to the electronic health records of non-competent patients is detailed. While the details of emergency access are outside the scope of the present invention, an illustration of one method of emergency access is provided here only to demonstrate, without limitation, the feasibility of emergency access when ordinarily a patient is only linked to their Unique Patient Identifier via their Health ID Card. In the illustration Emergency Room Doctor 220 is seeking to treat a Non-Competent Patient 2. Even if the Health ID Card 10 of Non-Competent Patient 2 is present, it cannot be activated if the patient is unable to enter their secret pass-phrase. Therefore the Health ID Card Integrated Circuit 13 is inactive and not accessible by the Hospital Workstation 221. The Doctor 2 however is able to identify the Non-Competent Patient 2 by name and/or additional identity information visible on the Health ID Card 10 or known by other means.

Emergency Unique Patient Identifier Recovery 80 is accessible to authorised Doctor 220 via Access Control 80. Note that the access control rules expressed in Access Control 80 are outside the scope of the present invention. After successful verification of the Doctor 220 by Access Control 80 and presentation of the Name 84 and/or other identity information of Non-Competent Patient 2, an encrypted copy 85 of the Name together with associated Unique Patient Identifier is transmitted back to the Hospital Workstation 221. The data is decrypted at the Hospital Workstation 221 and thereafter data pertaining to Non-Competent Patient 2 can be indexed within the Electronic Health Record 130 using the recovered Unique Patient Identifier.

While the preceding describes an embodiment of the invention relating to electronic health records, the present invention also has application in other areas such as passport identification data systems. Each passport holder routinely has a number assigned to them which is unique at least across the population of the issuing country, if not unique across the whole world. For national security purposes, additional unique identifying numbers might also be assigned to individuals, and kept secret. It is important for privacy and for protection against fraud that unauthorised persons are unable to readily make linkages between any of these numbers (including conventional passport numbers) and the passport holder's identity. A security objective of electronic passport systems design should be to mask the true identity of the passport holder whenever data from their passport is transmitted from the microchip.

Thus, a second embodiment of the present invention provides for an electronic passport system to be made more secure, as follows. All personal information contained in the passport's microchip is de-identified. This information can include passport number, other security numbers, nationality, cryptographic keys and codes, and/or biometric data, such as facial image data or fingerprint templates, used for verifying the holder's identity. All such de-identified information to be stored in the passport microchip is first formatted into an Anonymous Public Key Certificate, where the associated asymmetric cryptographic private key is kept under the control of the microchip. When the passport holder passes through an immigration checkpoint, electronic messages recording the passage are digitally signed by customs workstation software using the private key and the Anonymous Public Key Certificate, with the effect that subsequent verification of the digital signature positively confirms the fact that a particular electronic passport passed through immigration, without revealing any identifying personal information about the passport holder. Conventional border control information systems, wherein customs officers record information about travelers including passport details, could remain unchanged by application of the current invention as described.

Access to the private key controlled by the passport microchip must be closely controlled. In particular, instantiation of the private key for the creation of a digital signature is restricted to duly authorized persons, such as customs officers, or the passport holder. A range of access control measures may be appropriate for this purpose, including challenge-response security that detects the presence of authorized users, or PIN activation by the passport holder.

In this embodiment, in the event that an unauthorised wireless receiver is used to eavesdrop on transmissions from the passport microchip, or to surreptitiously scan the contents of the microchip, no personal identifying information is revealed.

Other computer systems equipped with appropriate communications interfaces could be used by the holder of an electronic passport as described to invoke the private key on the microchip to digitally sign personal electronic transactions such as customs declarations, visa applications, or electronic "arrivals cards". The current invention allows for such electronic transactions, when digitally signed using the private key controlled by the passport, to be strongly linked to the passport holder without revealing any personal identifying information about the holder. The presence of unique secret code numbers in the electronic passport, and reproduction of those numbers in the body of said digitally signed transactions, means said transactions are de-identified. The identity of the electronic passport holder can ordinarily only be ascertained when their passport is at hand (such as when they present in person to a customs officer or transportation official). For forensic investigation purposes, a secure back-end database with limited access could be maintained to record the linkages between passport holder names and their secret numbers.

Note that some countries and territories have expedited border control measures in place where instead of a passport, travelers can present a smart identity card to an immigration official. Some places may automate this process, with the smartcard being presented to a machine instead of a person, for scanning, with a computerized record being made of the transit. The present invention can be applied to smart identity cards in the same fashion as electronic passports, with all personal information relating to the card holder being de-identified and stored in the form of an Anonymous Public Key Certificate uniquely associated with the smartcard chip.

It will be appreciated by persons skilled in the art that numerous variations and/or modifications may be made to the invention as described in the specific embodiments disclosed herein, without departing from the spirit or scope of the invention as broadly described. It will be particularly appreciated that the present invention while described in its preferred embodiment as relating to electronic health record applications is equally well suited to other systems of electronic records and electronic transactions where the persons who are the subjects of the records may be identified using smartcards or similar identity devices and where the persons may be issued with Anonymous Public Key Certificates. It will be further appreciated that while the described preferred embodiment utilizes smartcards with integrated storage of asymmetric cryptographic Private Keys, the invention is equally suited to other types of portable personal computing devices with integrated storage of asymmetric cryptographic Private Keys, and to further types of portable personal computing devices wherein the Private Keys are stored external to the computing devices but remain under the control of the computing devices. The present embodiments are therefore to be considered in all respects as illustrative and not restrictive.

The invention claimed is:

1. A method for anonymously indexing records pertaining to registered users in an electronic record system, the method comprising:

storing an asymmetric cryptographic private key within, and under the control of a portable storage device associated with a registered user, the private key operating within a public key infrastructure;

creating an anonymous public key certificate and storing it within the public key infrastructure, the anonymous public key certificate being associated with an asymmetric cryptographic public key matching the asymmetric cryptographic private key, wherein the anonymous public key certificate contains an electronic record pointer, the electronic record pointer being associated with each item of personal information pertaining to the registered user held in the electronic record system;

providing the portable storage device with information for associating the registered user with the portable storage device; and indexing, within the electronic record system, the personal information of the registered user, the indexing including digitally signing the record of the personal information using the asymmetric cryptographic private key, wherein when a third party seeks to retrieve from the electronic record system a record pertaining to the registered user, unique association of the personal information with the registered user is anonymously verified by the electronic record system when presented with and using the anonymous public key certificate and the electronic record pointer, to effect anonymous indexing of the personal information within the electronic record system, and wherein said unique association is verifiable by using the anonymous public key certificate to verify the digital signature of the record, and wherein said verification is anonymous in that examination by said third party of the record, electronic record pointer and anonymous public key certificate does not reveal the identity of the associated registered user to said third party.

2. The method of claim 1 wherein the information for associating the registered user with the portable storage device is at least one of:
- human readable information; and
- machine readable information.

3. The method of claim 1 wherein the portable storage device is at least one of: a smartcard and an electronic passport.

4. The method according to claim 1 wherein the electronic record system is configured for identifiable indexing when a secret pass-phrase of the personal storage device has been entered.

5. An anonymously indexed electronic record system comprising:
- an electronic storage for anonymously indexing records of personal information pertaining to a registered user; and
- a portable storage device for a registered user, an asymmetric cryptographic private key being within and under the control of the portable storage device, the portable storage device being provided with information for associating the registered user with the portable storage device; and the portable storage device storing an anonymous public key certificate associated with an asymmetric cryptographic public key matching the asymmetric cryptographic private key, the anonymous public key certificate containing an electronic record pointer, the electronic record pointer being associated with each item of personal information of the registered user held in the electronic record system;
- wherein the records of personal information pertaining to the registered user are digitally signed by the asymmetric cryptographic private key, and wherein when a third party seeks to retrieve from the electronic record system a record pertaining to the registered user, unique association of the personal information with the registered user is anonymously verified by use of the anonymous public key certificate and the electronic record pointer to effect anonymous indexing of the electronic record system, and wherein said unique association is verifiable by using the anonymous public key certificate to verify the digital signature of the record, and wherein said verification is anonymous in that examination by said third party of the record, electronic record pointer and anonymous public key certificate does not reveal the identity of the associated registered user to said third party.

6. The system of claim 5 wherein the information for associating the registered user with the portable storage device is at least one of:
- human readable information; and
- machine readable information.

7. The system of claim 5 wherein the portable storage device is at least one of: a smartcard and an electronic passport.

8. The system of claim 5 wherein the anonymous public key certificate contains a personal data component.

9. The system of claim 8 wherein the personal data component comprises biometric data of the registered user.

10. The system of claim 5, wherein an access code is stored in the portable storage device allowing access to the asymmetric cryptographic private key.

11. The system of claim 5, wherein the asymmetric cryptographic private key can be copied with the registered user's authorization into the possession of an authorized user.

12. The system of claim 11 wherein the authorized user is a health care professional authorized by the registered user to enter an update to the registered user's indexed personal information.

13. A portable storage device for a registered user of an anonymously indexed electronic record system, the portable storage device being provided with information for associating the registered user with the portable storage device,
- wherein an asymmetric cryptographic private key is within and under the control of the portable storage device,
- wherein the portable storage device stores an anonymous public key certificate which is associated with an asymmetric cryptographic public key matching the asymmetric cryptographic private key, the anonymous public key certificate containing an electronic record pointer, the electronic record pointer being associated with each item of personal information of the registered user held in the electronic record system,
- wherein when a third party seeks to retrieve from the electronic record system a record pertaining to the registered user, unique association of personal information pertaining to the user which is anonymously indexed in the electronic record system and digitally signed by the asymmetric cryptographic private key with the user is anonymously verified by using anonymous public key certificate to verify the digital signature of the record, and
- wherein said verification is anonymous in that examination by said third party of the record, electronic record pointer and anonymous public key certificate does not reveal the identity of the associated registered user to said third party.

* * * * *